(12) United States Patent
Gye

(10) Patent No.: US 12,224,691 B2
(45) Date of Patent: Feb. 11, 2025

(54) APPARATUS FOR DETECTING MOTOR FAILURE

(71) Applicant: HYUNDAI MOBIS Co., Ltd., Seoul (KR)

(72) Inventor: Gwang Hyun Gye, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 260 days.

(21) Appl. No.: 17/895,419

(22) Filed: Aug. 25, 2022

(65) Prior Publication Data

US 2023/0075730 A1 Mar. 9, 2023

(30) Foreign Application Priority Data

Sep. 6, 2021 (KR) .......................... 10-2021-0118216

(51) Int. Cl.
*H02P 29/024* (2016.01)

(52) U.S. Cl.
CPC ...... *H02P 29/0241* (2016.02); *H02P 29/0243* (2016.02)

(58) Field of Classification Search
CPC .................. H02P 29/0241; H02P 29/0243
USPC .................................................. 318/400.21
See application file for complete search history.

(56) References Cited

U.S. PATENT DOCUMENTS

| | | | |
|---|---|---|---|
| 7,595,605 B2 * | 9/2009 | Buerk ................ | H02P 29/02 318/599 |
| 2013/0314013 A1 * | 11/2013 | Ajima ................ | B62D 5/0487 318/400.21 |

FOREIGN PATENT DOCUMENTS

KR 10-1787273 B1 10/2017

* cited by examiner

*Primary Examiner* — Kawing Chan
(74) *Attorney, Agent, or Firm* — Morgan, Lewis & Bockius LLP

(57) ABSTRACT

An apparatus for detecting a motor failure may include: a first motor failure detector configured to apply a reference voltage for failure detection to a motor, and then detect a changed voltage; a first motor power switch and a second motor power switch configured to switch both terminal voltages applied to drive the motor; a gate amplifier configured to apply a gate signal for controlling the turn on/off of the first and second motor power switches; and a controller configured to diagnose a failure of the motor controlled in one way, on the basis of voltages detected by the first and second motor power switches and the first motor failure detector, respectively.

20 Claims, 3 Drawing Sheets

APPARATUS FOR DETECTING MOTOR FAILURE

CROSS-REFERENCE TO RELATED APPLICATION

This application claims priority from and the benefit of Korean Patent Application No. 10-2021-0118216, filed on Sep. 6, 2021, which is hereby incorporated by reference for all purposes as if set forth herein.

BACKGROUND

Field

Exemplary embodiments of the present disclosure relate to an apparatus for detecting a motor failure, and more particularly, to an apparatus for detecting a motor failure, which can detect failures that may occur in a wire connected to a motor or the motor itself in a vehicle or system using the motor.

Discussion of the Background

In general, a motor refers to a device that changes electrical energy into mechanical energy by using a force applied to a conductor, through which a current flows, in a magnetic field. The motor is used for automated systems in various industrial fields, and recently replaces an engine in a vehicle or is used for a brake device or the like.

Examples of such a motor may include a DC motor and an AC motor, and the AC motor may be classified into a 3-phase AC motor and a single-phase AC motor.

The state of the motor may be divided into a non-driven state and a driven state. The non-driven state indicates a period in which the motor is not driven, and the driven state indicates a period in which the motor is driven, while a load is generated.

In such a motor, however, various failures may be caused by an open or short circuit due to various causes, and the open or short circuit may occur in a wire connected to the motor or the motor itself.

Therefore, there is a need for a technology which can rapidly and accurately detect a failure which may occur in the motor itself or the wire connected to the motor (e.g., one-way motor, two-way motor, or 3-phase motor), thereby reducing the time and cost required for maintaining and repairing the motor.

The related art of the present disclosure is disclosed in Korean Patent No. 10-1787273 registered on Oct. 11, 2017 and entitled "Motor Driving Apparatus and Method for Detecting Disconnection of Wire of the Same."

SUMMARY

Various embodiments are directed to an apparatus for detecting a motor failure, which can detect failures that may occur in a wire connected to a motor or the motor itself in a vehicle or system using the motor.

In an embodiment, an apparatus for detecting a motor failure may include: a first motor failure detector configured to apply a reference voltage for failure detection to a motor, and then detect a changed voltage; a first motor power switch and a second motor power switch configured to switch both terminal voltages applied to drive the motor; a gate amplifier configured to apply a gate signal for controlling the turn on/off of the first and second motor power switches; and a controller configured to diagnose a failure of the motor controlled in one way, on the basis of voltages detected by the first and second motor power switches and the first motor failure detector, respectively.

When the first motor failure detector applies a designated reference voltage in a non-driven state of the motor controlled in one way, the controller may diagnose that an open failure occurred in the non-driven state of the motor controlled in one way, in case that the reference voltage applied by the first motor failure detector is detected as it is.

When the first motor failure detector applies a designated reference voltage in a non-driven state of the motor controlled in one way, the controller may diagnose that a motor wire B+ short failure occurred in the non-driven state of the motor controlled in one direction, in case that a variation value higher than the reference voltage is detected.

When first motor failure detector applies a designated reference voltage in a non-driven state of the motor controlled in one way, the controller may diagnose that a motor wire GND short failure occurred in the non-driven state of the motor controlled in one way, in the case that a variation value lower than the reference voltage is detected.

When the first and second motor power switches are operated for a designated short time in a non-driven state of the motor controlled in one way, the controller may diagnose that a motor short failure occurred in the non-driven state of the motor controlled in one way, in case that a potential difference between drain and source terminals of the first motor power switch is equal to a potential difference between drain and source terminals of the second motor power switch and a voltage higher than a designated first reference value is detected.

When a potential difference between drain and source terminals of the first motor power switch and a potential difference between drain and source terminals of the second motor power switch are measured as values lower than a designated first reference value in a driven state of the motor controlled in one way, the controller may diagnose that a motor open failure occurred in the driven state of the motor controlled in one way.

When a potential difference between drain and source terminals of the first motor power switch and a potential difference between drain and source terminals of the second motor power switch are measured as values higher than a designated first reference value in a driven state of the motor controlled in one way, the controller may diagnose that a motor short failure occurred in the driven state of the motor controlled in one way.

When a potential difference between drain and source terminals of the first motor power switch and a potential difference between drain and source terminals of the second motor power switch are measured as values higher than a designated first reference value in a driven state of the motor controlled in one way, and a relation of ((potential difference of first motor power switch<potential difference of second motor power switch) & (load current of first motor power switch>reference current) & (load current of second motor power switch>reference current) is satisfied, the controller may diagnose that a motor wire B+ short failure occurred in the driven state of the motor controlled in one way.

When a potential difference between drain and source terminals of the first motor power switch and a potential difference between drain and source terminals of the second motor power switch are measured as values higher than a designated first reference value in a driven state of the motor controlled in one way, and a relation of ((potential difference of first motor power switch>potential difference of second motor power switch) & (load current of first motor power switch>reference current) & (load current of second motor power switch>reference current) is satisfied, the controller may diagnose that a motor wire GND short failure occurred in the driven state of the motor controlled in one way.

The controller may convert, into load currents, a potential difference between drain and source terminals of the first motor power switch and a potential difference between drain and source terminals of the second motor power switch in a driven state of the motor controlled in one way, and diagnose that a motor stall failure occurred in the driven state of the motor controlled in one way, when the potential differences are equal to each other and the load currents are retained in a designated reference current range for a longer time than a predetermined reference time.

In an embodiment, an apparatus for detecting a motor failure may include: a second motor failure detector configured to apply a reference voltage for failure detection to a motor, and then detect a changed voltage; a first motor power switch and a second motor power switch configured to switch both terminal voltages applied to drive the motor; a gate amplifier configured to apply a gate signal for controlling the turn on/off the first and second motor power switches; a plurality of motor driving switches switched according to an order designated by the gate amplifier when the first and second motor power switches are turned on, and configured to drive a motor, controlled in two ways or a 3-phase manner, in a designated direction; and a controller configured to diagnose a failure of the motor controlled in two ways or a 3-phase manner, on the basis of voltages detected by the first and second motor power switches and the first motor failure detector, respectively.

When the second motor failure detector applies a designated reference voltage to the motor in a non-driven state of the motor controlled in two ways or a 3-phase manner, the controller may diagnose that the motor is normal, in case that the reference voltage is detected from both terminals of the motor, and diagnose that a motor short failure occurred in a non-driven state of the motor controlled in two ways or a 3-phase manner, in case that the reference voltage is detected from one terminal of the motor and 0 V is detected from the other terminal of the motor.

When the second motor failure detector applies a designated reference voltage to the motor controlled in two ways or a 3-phase manner while the motor is a non-driven state, the controller diagnoses that a motor wire B+ short failure occurred in the non-driven state of the motor controlled in two ways or a 3-phase manner, in case that a variation value higher than the reference voltage is detected.

When the second motor failure detector applies a designated reference voltage to the motor controlled in two ways or a 3-phase manner while the motor is a non-driven state, the controller may diagnose that a motor wire GND short failure occurred in the non-driven state of the motor controlled in two ways or a 3-phase manner, in case that a variation value lower than the reference voltage is detected.

When the plurality of motor driving switches are operated for a designated short time in a non-driven state of the motor controlled in two ways or a 3-phase manner, the controller may diagnose that a motor short failure occurred in the non-driven state of the motor controlled in two ways or a 3-phase manner, in case that a potential difference between drain and source terminals of the first motor power switch and a potential difference between drain and source terminals of the second motor power switch are equal to each other and a voltage higher than a designated second reference value is detected.

When a potential difference between drain and source terminals of the first motor power switch and a potential difference between drain and source terminals of the second motor power switch are measured as values lower than a designated second reference value in a driven state of the motor controlled in two ways or a 3-phase manner, the controller may diagnose that a motor open failure occurred in the driven state of the motor controlled in two ways or a 3-phase manner.

When a potential difference between drain and source terminals of the first motor power switch and a potential difference between drain and source terminals of the second motor power switch are measured as values higher than a designated second reference value in a driven state of the motor controlled in two ways or a 3-phase manner, the controller diagnoses that a motor short failure occurred in the driven state of the motor controlled in two ways or a 3-phase manner.

When a potential difference between drain and source terminals of the first motor power switch and a potential difference between drain and source terminals of the second motor power switch are measured as values higher than a designated second reference value in a driven state of the motor controlled in two ways or a 3-phase manner, and a relation of ((potential difference of first motor power switch<potential difference of second motor power switch) & (load current of first motor power switch>reference current) & (load current of second motor power switch>reference current) is satisfied, the controller may diagnose that a motor wire B+ short failure occurred in the driven state of the motor controlled in two ways or a 3-phase manner.

When a potential difference between drain and source terminals of the first motor power switch and a potential difference between drain and source terminals of the second motor power switch are measured as values higher than a designated second reference value in a driven state of the motor controlled in two ways or a 3-phase manner, and a relation of ((potential difference of first motor power switch>potential difference of second motor power switch) & (load current of first motor power switch>reference current) & (load current of second motor power switch>reference current) is satisfied, the controller may diagnose that a motor wire GND short failure occurred in the driven state of the motor controlled in two ways or a 3-phase manner.

When the state in which a potential difference between drain and source terminals of the first motor power switch and a potential difference between drain and source terminals of the second motor power switch are higher than a designated second reference value in a driven state of the motor controlled in two ways or a 3-phase manner is maintained for a longer time than a designated reference time, the controller may diagnose that a motor stall failure occurred in the driven state of the motor controlled in two ways or a 3-phase manner.

In accordance with the embodiment of the present disclosure, the apparatus can detect failures which may occur in a wire connected to a motor or the motor itself in a vehicle or system using the motor.

DETAILED DESCRIPTION OF THE ILLUSTRATED EMBODIMENTS

Figure 1:
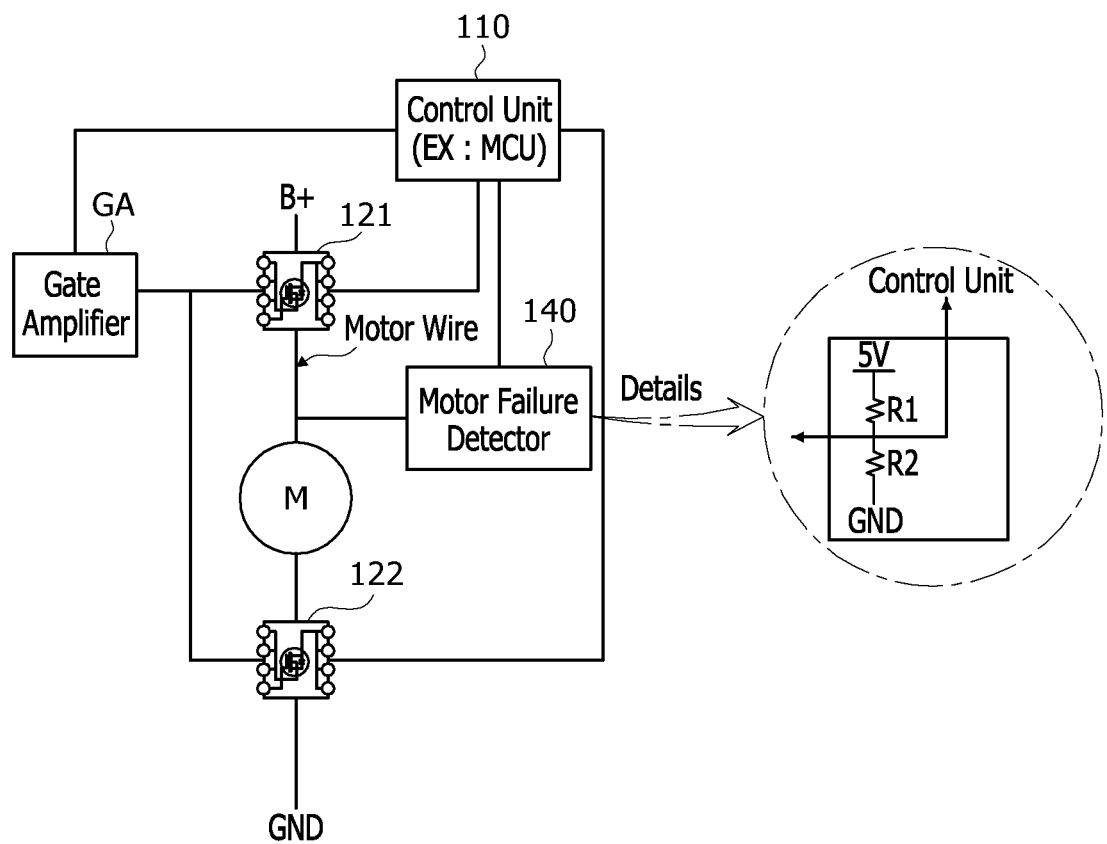
FIG. 1 is a diagram illustrating a schematic configuration of an apparatus for detecting a failure of a one-way motor in accordance with a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for detecting a motor failure will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a diagram illustrating a schematic configuration of an apparatus for detecting a failure of a one-way motor in accordance with a first embodiment of the present disclosure.

As illustrated in FIG. 1, the apparatus for detecting a failure of a one-way motor includes a first motor failure detector 140, first and second motor power switches (e.g., FET chips) 121 and 122, a gate amplifier GA, and a controller (e.g., MCU) 110. The first motor failure detector 140 serves to apply a reference voltage for failure detection to a motor M, and then detect a changed voltage. The first and second motor power switches 121 and 122 serve to switch both terminal voltages B+ and GND which are applied to drive the motor M. The gate amplifier GA serves to apply a gate signal for controlling the turn on/off of the first and second motor power switches 121 and 122 under control of the controller 110. The controller 110 serves to determine (diagnose) a failure of the motor M on the basis of voltages detected by the first and second motor power switches 121 and 122 and the first motor failure detector 140, respectively.

Hereafter, a method for detecting failures which may occur in a motor wire connected to the motor M or the motor M itself in a non-driven state or driven state when the controller 110 controls the motor M in one way will be described.

First, a method for detecting failures of the motor M in the non-driven state, which is controlled in one way, will be described.

<Normal State of One-Way Motor in Non-Driven State>

When the first motor failure detector 140 applies a designated reference voltage to the motor M under the assumption that the motor resistance of the motor M in a normal state is 300Ω or less, the controller 110 may diagnose that the motor is in the normal state, in case that a voltage (e.g., 0.9 V) lower than the reference voltage is detected, because the motor resistance (e.g., 300Ω)) and second resistance R2 of the first motor failure detector 140 are connected in parallel. For example, the designated reference voltage is a reference voltage which is a voltage of 2.5 V, divided by first resistance R1 (e.g., 1 kΩ) and the second resistance R2 (e.g., 1 kΩ), when a pull-up voltage of 5 V is applied in FIG. 1. The voltage lower than the reference voltage is a voltage corresponding to parallel composite resistance of the motor resistance and the second resistance R2.

<Motor Open Failure of Motor in Non-Driven State, Controlled in One Way>

When the first motor failure detector 140 applies the designated reference voltage to the motor M, the controller 110 diagnoses that a motor open failure occurred, in case that the designated reference voltage applied by the first motor failure detector 140 is detected as it is.

<Motor Wire B+ Short Failure in Non-Driven State of Motor Controlled in One Way>

When the first motor failure detector 140 applies the designated reference voltage to the motor M, the controller 110 diagnoses that a motor wire B+ short failure occurred, in case that a variation value (e.g., B+ voltage) higher than the designated reference voltage is detected.

<Motor Wire GND Short Failure in Non-Driven State of Motor Controlled in One Way>

When the first motor failure detector 140 applies the designated reference voltage to the motor M, the controller 110 diagnoses that a motor wire GND short failure occurred, in case that a variation value (e.g., GND voltage) lower than the designated reference voltage is detected.

<Motor Short Failure in Non-Driven State of Motor Controlled in One Way>

When the controller 110 operates the first and second motor power switches 121 and 122 for a designated short time (e.g., several µs), the controller 110 diagnoses that a motor short failure occurred, in case that the potential difference between both terminals (drain and source) of the first motor power switch 121 and the potential difference between both terminals (drain and source) of the second motor power switch 122 are equal to each other, and a voltage higher than a designated first reference value is detected.

For reference, the drain and source terminals may be sensed through an ASIC or IC element, and the controller 110 may receive the sensing data through SPI communication or as a voltage.

In other words, since the same load current flows through the first and second motor power switches 121 and 122 in case of the motor short failure, the potential differences of the first and second motor power switches 121 and 122 may become equal to each other, and the motor short failure may not be distinguished from the motor wire GND short failure.

In the present embodiment, when the motor M is operated for a designated short time, the controller 110 diagnoses that a motor short failure occurred, in case that the potential difference between both terminals (drain and source) of the first motor power switch 121 and the potential difference between both terminals (drain and source) of the second motor power switch 122 are equal to each other, and higher than the first reference value predefined in the controller 110 (e.g., (potential difference of first motor power switch 121==potential difference of second motor power switch 122) & (potential difference of first motor power switch 121>first reference value) & (potential difference of second motor power switch 122>first reference value)).

Hereafter, a method for detecting failures in the driven state of the motor M which is controlled in one way will be described.

In the present embodiment, when the motor is driven, currents may flow through the first and second motor power switches 121 and 122. At this time, the controller 110 may estimate load currents I by converting the potential difference between both terminals (drains and sources) of the first motor power switch 121 and the potential difference between both terminals (drains and sources) of the second motor power switch 122 into currents, where load currents I=(internal resistance of first motor power switch 121/motor resistance) and (internal resistance of second motor power switch 122/motor resistance).

<Motor Open Failure in Driven State of Motor Controlled One Way>

When the motor is open, the load current becomes 0 A. Thus, when the potential difference between both terminals (drains and sources) of the first motor power switch 121 and the potential difference between both terminals (drains and sources) of the second motor power switch 122 are measured as values lower than the first reference value (or reference current), the controller 110 diagnoses that a motor open failure occurred.

If a relation of ((load current of first motor power switch 121<reference current) & (load current of second motor power switch 122<reference current)) is satisfied, the controller 110 diagnoses that the motor open failure occurred.

<Motor Short Failure in Driven State of Motor Controlled One Way>

When the motor is shorted, a potential difference due to an overcurrent occurs between both terminals (drains and sources) of the first motor power switch 121 and between both terminals (drains and sources) of the second motor power switch 122. Thus, the controller 110 may convert the potential difference between both terminals (drains and sources) of the first motor power switch 121 and the potential difference between both terminals (drains and sources) of the second motor power switch 122 into load currents, and diagnose that that a motor short failure occurred, in case that the load currents are measured as values higher than the first reference value (or reference current).

If a relation of ((potential difference of first motor power switch 121==potential difference of the second motor power switch 122) & (load current of first motor power switch 121>reference current) & (load current of second motor power switch 122>reference current)) is satisfied, the controller 110 diagnoses that the motor short failure occurred.

<Motor Wire B+/GND Short Failure in Driven State of Motor Controlled One Way>

In case of motor wire B+/GND short, the potential difference between both terminals (drains and sources) of the first motor power switch 121 and the potential difference between both terminals (drains and sources) of the second motor power switch 122 are different from each other, due to the difference between the load currents flowing through both terminals (drain and source) of the first motor power switch 121 and both terminals (drain and source) of the second motor power switch 122. Therefore, when the potential difference between both terminals (drains and sources) of the first motor power switch 121 and the potential difference between both terminals (drains and sources) of the second motor power switch 122 are measured as values higher than the first reference value, the controller 110 diagnoses that a short failure (e.g., motor wire B+ short failure or motor wire GND short failure) occurred, and diagnoses the type of the short failure on the basis of the potential difference between both terminals (drains and sources) of the first motor power switch 121 and the potential difference between both terminals (drains and sources) of the second motor power switch 122.

For example, when a relation of ((potential difference of first motor power switch 121<potential difference of second motor power switch 122) & (load current of first motor power switch 121>reference current) & (load current of second motor power switch 122>reference current)) is satisfied, the controller 110 determines that a motor wire B+ short failure occurred. That is, in case of the motor wire B+ short failure, the amount of current flowing through the second motor power switch 122 is larger than the amount of current flowing through the first motor power switch 121.

Furthermore, when a relation of ((potential difference of first motor power switch 121>potential difference of second motor power switch 122) & (load current of first motor power switch 121>reference current) & (load current of second motor power switch 122>reference current)) is satisfied, the controller 110 determines that the motor wire GND short failure occurred. That is, in case of the motor wire GND short failure, the amount of current flowing through the first motor power switch 121 is larger than the amount of current flowing through the second motor power switch 122.

<Motor Stall Failure of Motor Controlled One Way>

The controller 110 converts, into load currents, the potential difference between both terminals (drains and sources) of the first motor power switch 121 and the potential difference between both terminals (drains and sources) of the second motor power switch 122, in the driven state of the motor controlled in one way. When the potential differences are equal to each other and the load currents are retained in a designated reference current range for a longer time than a designated reference time, the controller 110 diagnoses that a motor stall failure occurred in the driven state of the motor controlled in one way. The reference current range is designated as a range lower than the first reference value in case of a motor short failure.

Figure 2:
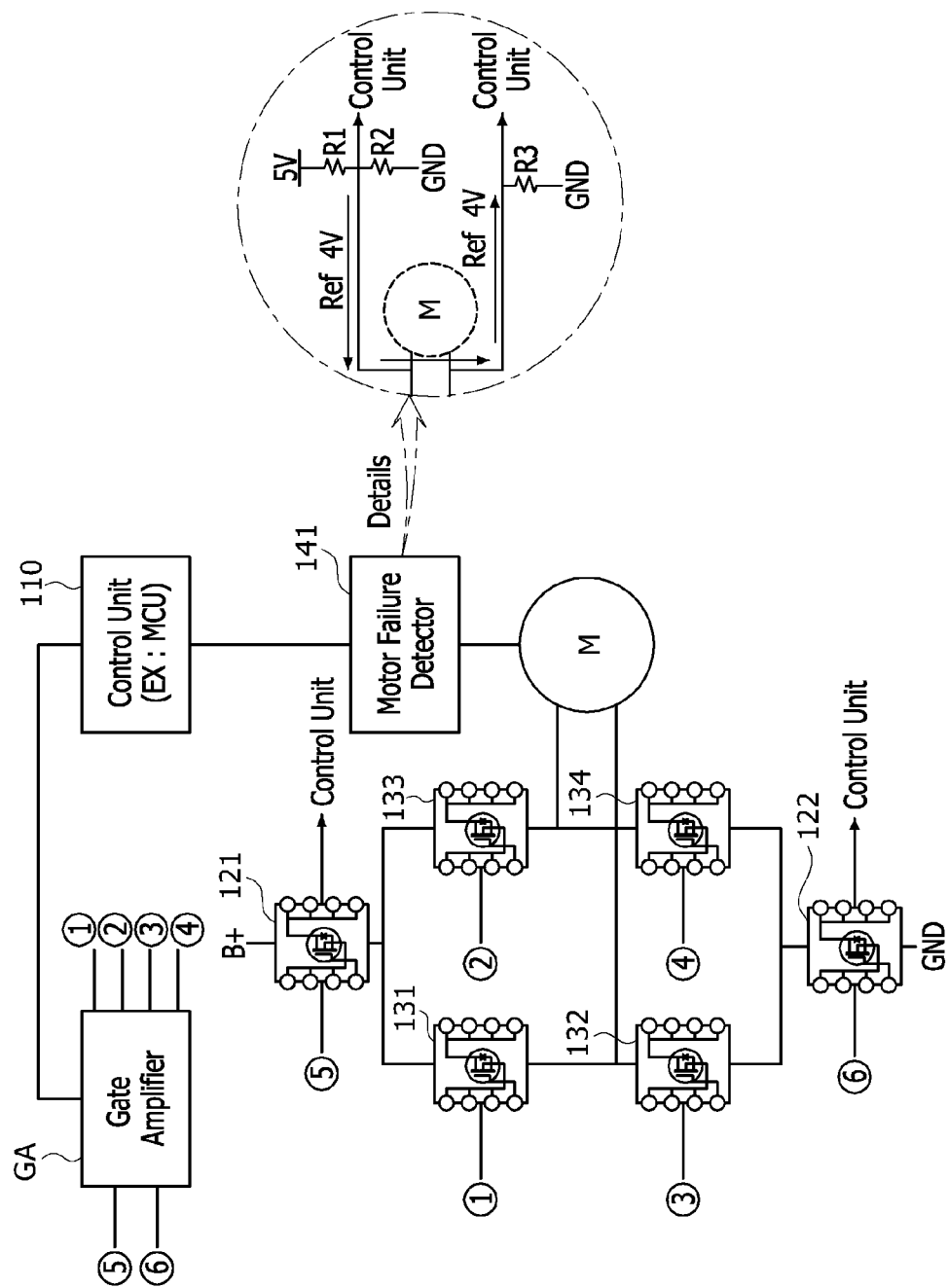
FIG. 2 is a diagram illustrating a schematic configuration of an apparatus for detecting a failure of a two-way motor in accordance with a second embodiment of the present disclosure.

FIG. 2 is a diagram illustrating a schematic configuration an apparatus for detecting a failure of a two-way motor in accordance with a second embodiment of the present disclosure.

As illustrated in FIG. 2, the apparatus for detecting a failure of a two-way motor includes a second motor failure detector 141, first and second motor power switches (e.g., FET chips) 121 and 122, a gate amplifier GA, first to fourth motor driving switches 131 to 134, and a controller 110. The second motor failure detector 141 serves to apply a reference voltage for failure detection to a motor M, and detect a changed voltage. The first and second motor power switches 121 and 122 serve to switch both terminal voltages B+ and GND applied to drive the motor M. The gate amplifier GA serves to apply a gate signal for controlling the turn on/off of the first and second motor power switches 121 and 122 under control of the controller 110. The first to fourth motor driving switches 131 to 134 are switched according to an order designated by the gate amplifier GA when the first and second motor power switches 121 and 122 are turned on, and serve to drive the motor in a designated direction. The controller 110 serves to determine (diagnose) a failure of the motor M on the basis of voltages detected by the first and second motor power switches 121 and 122 and the second motor failure detector 141, respectively.

Hereafter, a method for detecting failures which may occur in a wire connected to the motor M or the motor M itself in a non-driven state or driven state when the controller 110 controls the motor M in two ways will be described.

First, a method for detecting failures in the non-driven state of the motor M controlled in two ways will be described.

<Motor Open Failure in Non-Driven State of Motor Controlled in Two Ways>

When the second motor failure detector 141 applies a designated reference voltage (e.g., 4 V) to the motor M, the reference voltage is detected from both terminals of the motor if the motor is in a normal state. In this case, the internal resistance of the motor is low, and third resistance R3 of the second motor failure detector is very high. However, when the motor is open (e.g., motor internal open or motor wire open), the reference voltage is detected from the terminal of the motor, which is not open, and 0 V is detected from the terminal of the motor, which is open. Therefore, when recognizing (detecting) the potential difference between both terminals of the motor, the controller 110 diagnoses that a motor open failure occurred.

<Motor Wire B+ Short Failure in Non-Driven State of Motor Controlled in Two Ways>

When the second motor failure detector 141 applies the designated reference voltage to the motor M, the controller 110 diagnoses that a motor wire B+ short failure occurred, in case that a variation value (e.g., B+ voltage) higher than the reference voltage is detected.

<Motor Wire GND Short Failure in Non-Driven State of Motor Controlled in Two Ways>

When the second motor failure detector 141 applies the designated reference voltage to the motor M, the controller 110 diagnoses that a motor wire GND short failure occurred, in case that a variation value (e.g., GND voltage) lower than the reference voltage is detected.

<Motor Short Failure in Non-Driven State of Motor Controlled in Two Ways>

When the controller 110 operates the first to fourth motor driving switches 131 to 134 for a designated short time (e.g., several μs), the controller 110 diagnoses that a motor short failure occurred, in case that the potential difference between both terminals (drain and source) of the first motor power switch 121 and the potential difference between both terminals (drain and source) of the second motor power switch 122 are equal to each other, and a voltage higher than a designated second reference value is detected.

Hereafter, a method for detecting failures in the driven state of the motor M controlled in two ways will be described.

<Motor Open Failure in Driven State of Motor Controlled in Two Ways>

When the motor is open, a load current becomes 0 A. Thus, when the potential difference between both terminals (drain and source) of the first motor power switch 121 and the potential difference between both terminals (drain and source) of the second motor power switch 122 are measured as values lower than the second reference value (or reference current), the controller 110 diagnoses that a motor open failure occurred.

If a relation of ((load current of first motor power switch 121<reference current) & (load current of second motor power switch 122<reference current)) is satisfied, the controller 110 diagnoses that the motor open failure occurred.

<Motor Short Failure in Driven State of Motor Controlled in Two Ways>

When the motor is shorted, a potential difference due to an overcurrent occurs between both terminals (drain and source) of the first motor power switch 121 and between both terminals (drain and source) of the second motor power switch 122. Thus, the controller 110 converts the potential difference between both terminals (drain and source) of the first motor power switch 121 and the potential difference between both terminals (drain and source) of the second motor power switch 122 into load currents, and diagnoses that a motor short failure occurred, when the load currents are measured as values higher than the second reference value.

If a relation of ((potential difference of first motor power switch 121=potential difference of the second motor power switch 122) & (load current of first motor power switch 121>reference current) & (load current of second motor power switch 122>reference current)) is satisfied, the controller 110 diagnoses that the motor short failure occurred.

<Motor Wire B+/GND Short Failure of Motor Controlled in Two Ways>

In case of motor wire B+/GND short, the potential difference between both terminals (drain and source) of the first motor power switch 121 and the potential difference between both terminals (drain and source) of the second motor power switch 122 are different from each other, due to the difference between the load currents flowing through both terminals (drain and source) of the first and second motor power switches 121 and 122. Therefore, when the potential difference between both terminals (drain and source) of the first motor power switch 121 and the potential difference between both terminals (drain and source) of the second motor power switch 122 are measured as values higher than the second reference value or the reference current, the controller 110 diagnoses that a short failure (e.g., motor wire B+ short failure or motor wire GND short failure) occurred, and determines the type of the short failure on the basis of the potential difference between both terminals (drain and source) of the first motor power switch 121 and the potential difference between both terminals (drain and source) of the second motor power switch 122.

For example, when a relation of ((potential difference of first motor power switch 121<potential difference of second motor power switch 122) & (load current of first motor power switch 121>reference current) & (load current of second motor power switch 122>reference current)) is satisfied, the controller 110 determines that a motor wire B+ short failure occurred. That is, in case of the motor wire B+ short failure, the amount of current flowing through the second motor power switch 122 is larger than the amount of current flowing through the first motor power switch 121.

Furthermore, when a relation of ((potential difference of first motor power switch 121>potential difference of second motor power switch 122) & (load current of first motor power switch 121>reference current) & (load current of second motor power switch 122>reference current)) is satisfied, the controller 110 determines that the motor wire GND short failure occurred. That is, in case of the motor wire GND short failure, the amount of current flowing through the first motor power switch 121 is larger than the amount of current flowing through the second motor power switch 122.

<Motor Stall Failure in Driven State of Motor Controlled in Two Ways>

The controller 110 monitors the potential difference between both terminals (drain and source) of the first motor power switch 121 and the potential difference between both terminals (drain and source) of the second motor power switch 122, and diagnoses that a motor stall failure occurred, when the state in which the potential differences are higher than the second reference value is maintained for a longer time than a designated reference time.

Figure 3:
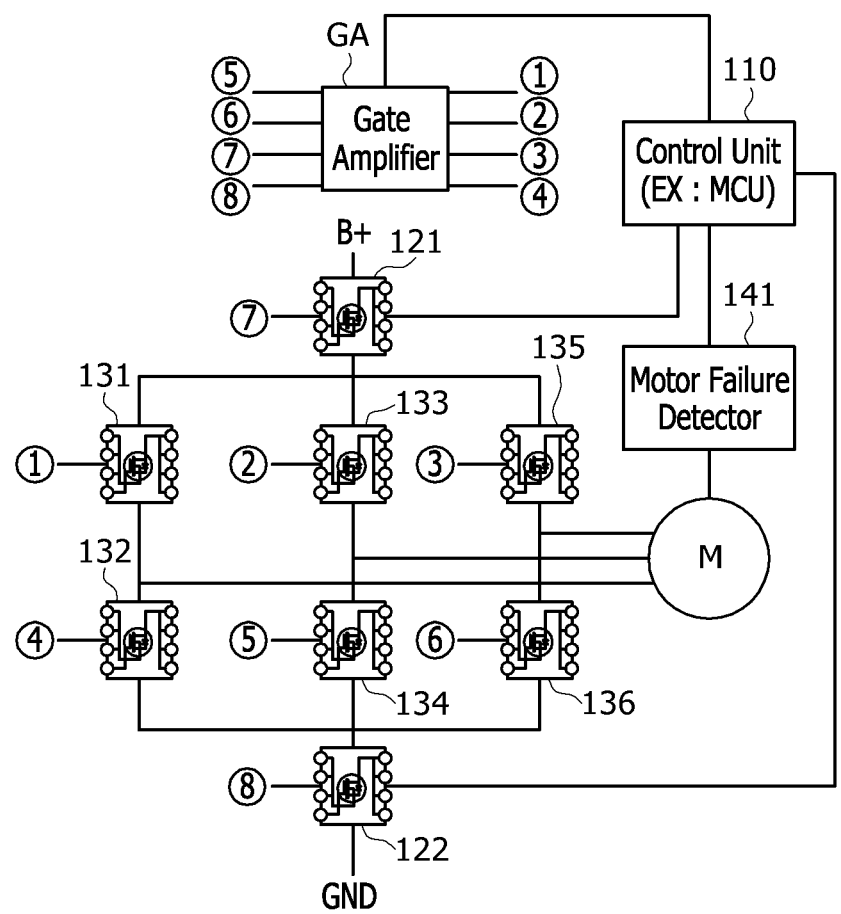
FIG. 3 is a diagram illustrating a schematic configuration of an apparatus for detecting a failure of a 3-phase motor in accordance with a third embodiment of the present disclosure.

FIG. 3 is a diagram illustrating a schematic configuration of an apparatus for detecting a failure of a 3-phase motor in accordance with a third embodiment of the present disclosure.

As illustrated in FIG. 3, the apparatus for detecting a failure of a 3-phase motor includes a second motor failure detector 141, first and second motor power switches (e.g., FET chips) 121 and 122, a gate amplifier GA, first to sixth motor driving switches 131 to 136, and a controller 110. The second motor failure detector 141 serves to apply a reference voltage for failure detection to a motor M, and detect a changed voltage. The first and second motor power switches 121 and 122 serve to switch both terminal voltages B+ and GND applied to drive the motor M. The gate amplifier GA serves to apply a gate signal for controlling the turn on/off of the first and second motor power switches 121 and 122 under control of the controller 110. The first to sixth motor driving switches 131 to 136 are switched according to an order designated by the gate amplifier GA when the first and second motor power switches 121 and 122 are turned on, and serve to drive the motor in a designated direction in a 3-phase manner. The controller 110 serves to determine (diagnose) a failure of the motor M on the basis of voltages detected by the first to sixth motor driving switches 131 to 136, the first and second motor power switches 121 and 122, and the second motor failure detector 141, respectively.

Hereafter, a method for detecting failures which may occur in a motor wire connected to the motor M or the motor M itself in a non-driven state or driven state when the controller 110 controls the motor M in a 3-phase manner will be described. In this case, the method is substantially the same as the method for detecting failures which may occur in a motor wire connected to the motor M or the motor M itself in a non-driven state or driven state when the controller 110 controls the motor M in two ways, except the motor driving circuits.

First, a method for detecting failures in the non-driven state of the motor M controlled in a 3-phase manner will be described.

<Motor Open Failure in Non-Driven State of Motor Controlled in 3-Phase Manner>

When the second motor failure detector 141 applies a designated reference voltage (e.g., 4 V) to the motor M, the reference voltage is detected from both terminals of the motor if the motor is in a normal state. In this case, the internal resistance of the motor is low, and third resistance R3 of the second motor failure detector is very high. However, when the motor is open (e.g., motor internal open or motor wire open), the reference voltage is detected from the terminal of the motor, which is not open, and 0 V is detected from the terminal of the motor, which is open. Therefore, when recognizing (detecting) the potential difference between both terminals of the motor, the controller 110 diagnoses that a motor open failure occurred.

<Motor Wire B+ Short Failure in Non-Driven State of Motor Controlled in 3-Phase Manner>

When the second motor failure detector 141 applies the designated reference voltage to the motor M, the controller 110 diagnoses that a motor wire B+ short failure occurred, in case that a variation value (e.g., B+ voltage) higher than the reference voltage is detected.

<Motor Wire GND Short Failure in Non-Driven State of Motor Controlled in 3-Phase Manner>

When the second motor failure detector 141 applies the designated reference voltage to the motor M, the controller 110 diagnoses that a motor wire GND short failure occurred, in case that a variation value (e.g., GND voltage) lower than the reference voltage is detected.

<Motor Short Failure in Non-Driven State of Motor Controlled in 3-Phase Manner>

When the controller 110 operates the first to fourth motor driving switches 131 to 134 for a designated short time (e.g., several μs), the controller 110 diagnoses that a motor short failure occurred, in case that the potential difference between both terminals (drain and source) of the first motor power switch 121 and the potential difference between both terminals (drain and source) of the second motor power switch 122 are equal to each other, and a voltage higher than a designated second reference value is detected.

Hereafter, a method for detecting failures in the driven state of the motor M controlled in a 3-phase manner will be described.

<Motor Open Failure in Driven State of Motor Controlled in 3-Phase Manner>

When the motor is open, a load current becomes 0 A. Thus, when the potential difference between both terminals (drain and source) of the first motor power switch 121 and the potential difference between both terminals (drain and source) of the second motor power switch 122 are measured as values lower than the second reference value (or reference current), the controller 110 diagnoses that a motor open failure occurred.

If a relation of ((load current of first motor power switch 121<reference current) & (load current of second motor power switch 122<reference current)) is satisfied, the controller 110 diagnoses that the motor open failure occurred.

<Motor Short Failure in Driven State of Motor Controlled in 3-Phase Manner>

When the motor is shorted, a potential difference due to an overcurrent occurs between both terminals (drain and source) of the first motor power switch 121 and between both terminals (drain and source) of the second motor power switch 122. Thus, the controller 110 converts the potential difference between both terminals (drain and source) of the first motor power switch 121 and the potential difference between both terminals (drain and source) of the second motor power switch 122 into load currents, and diagnoses that a motor short failure occurred, when the load currents are measured as values higher than the second reference value.

If a relation of ((potential difference of first motor power switch 121==potential difference of the second motor power switch 122) & (load current of first motor power switch 121>reference current) & (load current of second motor power switch 122>reference current)) is satisfied, the controller 110 diagnoses that the motor short failure occurred.

<Motor Wire B+/GND Short Failure of Motor Controlled in 3-Phase Manner>

In case of motor wire B+/GND short, the potential difference between both terminals (drain and source) of the first motor power switch 121 and the potential difference between both terminals (drain and source) of the second motor power switch 122 are different from each other, due to the difference between the load currents flowing through both terminals (drain and source) of the first motor power switch 121 and both terminals (drain and source) of the second motor power switch 122. Therefore, when the potential difference between both terminals (drain and source) of the first motor power switch 121 and the potential difference between both terminals (drain and source) of the second motor power switch 122 are measured as values higher than the second reference value or the reference current, the controller 110 diagnoses that a short failure (e.g., motor wire B+ short failure or motor wire GND short failure) occurred, and determines the type of the short failure on the basis of the potential difference between both terminals (drain and source) of the first motor power switch 121 and the potential difference between both terminals (drain and source) of the second motor power switch 122.

For example, when a relation of ((potential difference of first motor power switch 121<potential difference of second motor power switch 122) & (load current of first motor power switch 121>reference current) & (load current of second motor power switch 122>reference current)) is satisfied, the controller 110 determines that a motor wire B+ short failure occurred. That is, in case of the motor wire B+ short failure, the amount of current flowing through the second motor power switch 122 is larger than the amount of current flowing through the first motor power switch 121.

Furthermore, when a relation of ((potential difference of first motor power switch 121>potential difference of second motor power switch 122) & (load current of first motor power switch 121>reference current) & (load current of second motor power switch 122>reference current)) is satisfied, the controller 110 determines that the motor wire GND short failure occurred. That is, in case of the motor wire GND short failure, the amount of current flowing through the first motor power switch 121 is larger than the amount of current flowing through the second motor power switch 122.

<Motor Stall Failure in Driven State of Motor Controlled in 3-Phase Manner>

The controller 110 monitors the potential difference between both terminals (drain and source) of the first motor power switch 121 and the potential difference between both terminals (drain and source) of the second motor power switch 122, and diagnoses that a motor stall failure occurred, when the state in which the potential differences are higher than the second reference value is maintained for a longer time than a designated reference time.

As described above, the apparatuses in accordance with the present embodiments can detect failures which may occur in a wire connected to a motor or the motor itself in a vehicle or system using the motor.

Although the present disclosure has been disclosed with reference to the embodiments illustrated in the drawings, the embodiments are only for illustrative purposes, and those skilled in the art will appreciate that various modifications and other equivalent embodiments are possible therefrom. Thus, the true technical scope of the present disclosure should be defined by the following claims. Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for detecting a motor failure, comprising:
   a first motor failure detector configured to detect a voltage after applying a reference voltage for failure detection to a motor;
   a first motor power switch and a second motor power switch configured to switch respective terminal voltages applied to drive the motor;
   a gate amplifier configured to apply a gate signal for controlling turning on/off of the first and second motor power switches; and
   a controller configured to diagnose a failure of the motor controlled in one direction of current flowing, based on the voltage detected by the first motor failure detector and potential differences of the first and second motor power switches.

2. The apparatus of claim 1, wherein when the first motor failure detector applies the reference voltage in a non-driven state of the motor, the controller diagnoses that an open circuit failure occurred in the non-driven state of the motor, in a case that the detected voltage is same as the reference voltage applied by the first motor failure detector.

3. The apparatus of claim 1, wherein when the first motor failure detector applies the reference voltage in a non-driven state of the motor, the controller diagnoses that a B+ short circuit failure of a motor wire connected to the motor, among terminal voltages B+ and ground (GND) applied to drive the motor, occurred in the non-driven state of the motor, in a case that the detected voltage is higher than the reference voltage.

4. The apparatus of claim 1, wherein when the first motor failure detector applies the reference voltage in a non-driven state of the motor, the controller diagnoses that a GND short circuit failure of a motor wire connected to the motor, among terminal voltages B+ and ground (GND) applied to drive the motor, occurred in the non-driven state of the motor, in a case that the detected voltage is lower than the reference voltage.

5. The apparatus of claim 1, wherein when the first and second motor power switches are operated for a designated short time in a non-driven state of the motor, the controller diagnoses that a motor short circuit failure occurred in the non-driven state of the motor, in a case that a potential difference between drain and source terminals of the first motor power switch is equal to a potential difference between drain and source terminals of the second motor power switch and that the detected voltage is a higher than a designated first reference value.

6. The apparatus of claim 1, wherein when a potential difference between drain and source terminals of the first motor power switch and a potential difference between drain and source terminals of the second motor power switch are measured as values lower than a designated first reference value in a driven state of the motor, the controller diagnoses that a motor open circuit failure occurred in the driven state of the motor.

7. The apparatus of claim 1, wherein when a potential difference between drain and source terminals of the first motor power switch and a potential difference between drain and source terminals of the second motor power switch are measured as values higher than a designated first reference value in a driven state of the motor, the controller diagnoses that a motor short circuit failure occurred in the driven state of the motor.

8. The apparatus of claim 1, wherein when a potential difference between drain and source terminals of the first motor power switch and a potential difference between drain and source terminals of the second motor power switch are measured as values higher than a designated first reference value in a driven state of the motor, and a relation of ((potential difference of the first motor power switch<potential difference of the second motor power switch) & (load current of the first motor power switch>reference current) & (load current of the second motor power switch>reference current) is satisfied, the controller diagnoses that a B+ short circuit failure of a motor wire connected to the motor, among terminal voltages B+ and ground (GND) applied to drive the motor, occurred in the driven state of the motor.

9. The apparatus of claim 1, wherein when a potential difference between drain and source terminals of the first motor power switch and a potential difference between drain and source terminals of the second motor power switch are measured as values higher than a designated first reference value in a driven state of the motor, and a relation of ((potential difference of the first motor power switch>potential difference of the second motor power switch) & (load current of the first motor power switch>reference current) & (load current of the second motor power switch>reference current) is satisfied, the controller diagnoses that a GND short circuit failure of a motor wire connected to the motor, among terminal voltages B+ and ground (GND) applied to drive the motor, occurred in the driven state of the motor.

10. The apparatus of claim 1, wherein the controller converts, into load currents, a potential difference between drain and source terminals of the first motor power switch and a potential difference between drain and source terminals of the second motor power switch in a driven state of the motor, and diagnoses that a motor stall failure occurred in the driven state of the motor, when the potential differences are equal to each other and the load currents are retained in a designated reference current range for a longer time than a predetermined reference time.

11. An apparatus for detecting a motor failure, comprising:
a first motor failure detector configured to detect a voltage after applying a reference voltage for failure detection to a motor;
a first motor power switch and a second motor power switch configured to switch respective terminal voltages applied to drive the motor;
a gate amplifier configured to apply a gate signal for controlling turning on/off of the first and second motor power switches;
a plurality of motor driving switches switched according to an order designated by the gate amplifier when the first and second motor power switches are turned on, and configured to drive a motor, controlled in two directions of current flowing or a 3-phase manner, in a designated direction; and
a controller configured to diagnose a failure of the motor, based on the voltage detected by the first motor failure detector and potential differences of the first and second motor power switches.

12. The apparatus of claim 11, wherein when the first motor failure detector applies the reference voltage to the motor in a non-driven state of the motor, the controller diagnoses that the motor is normal, in a case that voltages detected from both terminals of the motor are equal to the reference voltage, and diagnoses that a motor short circuit failure occurred in the non-driven state of the motor, in a case that one voltage detected from one terminal of the motor is equal to the reference voltage and 0 V is detected from the other terminal of the motor.

13. The apparatus of claim 11, wherein when the first motor failure detector applies the reference voltage to the motor while the motor is in a non-driven state, the controller diagnoses that a B+ short circuit failure of a motor wire connected to the motor, among terminal voltages B+ and ground (GND) applied to drive the motor, occurred in the non-driven state of the motor, in a case that a the detected voltage is higher than the reference voltage.

14. The apparatus of claim 11, wherein when the first motor failure detector applies the reference voltage to the motor while the motor is in a non-driven state, the controller diagnoses that a GND short circuit failure of a motor wire connected to the motor, among terminal voltages B+ and ground (GND) applied to drive the motor, occurred in the non-driven state of the motor, in a case that the detected voltage is lower than the reference voltage.

15. The apparatus of claim 11, wherein when the plurality of motor driving switches are operated for a designated short time in a non-driven state of the motor, the controller diagnoses that a motor short circuit failure occurred in the non-driven state of the motor, in a case that a potential difference between drain and source terminals of the first motor power switch and a potential difference between drain and source terminals of the second motor power switch are equal to each other and that the detected voltage is higher than a designated second reference value.

16. The apparatus of claim 11, wherein when a potential difference between drain and source terminals of the first motor power switch and a potential difference between drain and source terminals of the second motor power switch are measured as values lower than a designated second reference value in a driven state of the motor, the controller diagnoses that a motor open circuit failure occurred in the driven state of the motor.

17. The apparatus of claim 11, wherein when a potential difference between drain and source terminals of the first motor power switch and a potential difference between drain and source terminals of the second motor power switch are measured as values higher than a designated second reference value in a driven state of the motor, the controller diagnoses that a motor short circuit failure occurred in the driven state of the motor.

18. The apparatus of claim 11, wherein when a potential difference between drain and source terminals of the first motor power switch and a potential difference between drain and source terminals of the second motor power switch are measured as values higher than a designated second reference value in a driven state of the motor, and a relation of ((potential difference of the first motor power switch<potential difference of the second motor power switch) & (load current of the first motor power switch>reference current) & (load current of the second motor power switch>reference current) is satisfied, the controller diagnoses that a B+ short circuit failure of a motor wire connected to the motor, among terminal voltages B+ and ground (GND) applied to drive the motor, occurred in the driven state of the motor.

19. The apparatus of claim 11, wherein when a potential difference between drain and source terminals of the first motor power switch and a potential difference between drain and source terminals of the second motor power switch are measured as values higher than a designated second reference value in a driven state of the motor, and a relation of ((potential difference of the first motor power switch>potential difference of the second motor power switch) & (load current of the first motor power switch>reference current) & (load current of the second motor power switch>reference current) is satisfied, the controller diagnoses that a GND short circuit failure of a motor wire connected to the motor, among terminal voltages B+ and ground (GND) applied to drive the motor, occurred in the driven state of the motor.

20. The apparatus of claim 11, wherein when the state in which a potential difference between drain and source terminals of the first motor power switch and a potential difference between drain and source terminals of the second motor power switch are higher than a designated second reference value in a driven state of the motor is maintained for a longer time than a designated reference time, the controller diagnoses that a motor stall failure occurred in the driven state of the motor.

* * * * *